US010990595B2

United States Patent
Roth et al.

(10) Patent No.: US 10,990,595 B2
(45) Date of Patent: Apr. 27, 2021

(54) FAST DISTRIBUTED GRAPH QUERY ENGINE

(71) Applicant: Oracle International Corporation, Redwood Shores, CA (US)

(72) Inventors: Nicholas Roth, San Jose, CA (US); Sungpack Hong, Palo Alto, CA (US); Petr Koupy, Blansko (CZ); Jinsu Lee, San Mateo, CA (US); Vasileios Trigonakis, Zurich (CH); Abderrahmane Melhaoui, Rabat (MA); Stefan Kaestle, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 16/274,210

(22) Filed: Feb. 12, 2019

(65) Prior Publication Data

US 2019/0354526 A1    Nov. 21, 2019

Related U.S. Application Data

(60) Provisional application No. 62/673,366, filed on May 18, 2018.

(51) Int. Cl.
  *G06F 16/00* (2019.01)
  *G06F 16/2453* (2019.01)
  (Continued)

(52) U.S. Cl.
  CPC ...... *G06F 16/24542* (2019.01); *G06F 16/278* (2019.01); *G06F 16/9024* (2019.01)

(58) Field of Classification Search
  CPC ............ G06F 16/24542; G06F 16/278; G06F 16/9024; G06F 16/2471; G06F 16/2453;
  (Continued)

(56) References Cited

U.S. PATENT DOCUMENTS 6,081,801 A * 6/2000 Cochrane ............... G06Q 10/04
7,757,214 B1   7/2010 Palcazk
(Continued)

FOREIGN PATENT DOCUMENTS

WO   WO2015099562 A1   7/2015

OTHER PUBLICATIONS

Manhardt, U.S. Appl. No. 15/175,920, filed Jun. 7, 2016, Advisory Action, dated Sep. 28, 2018.
(Continued)

*Primary Examiner* — Anh Ly
(74) *Attorney, Agent, or Firm* — Hickman Becker Bingham Ledesma LLP

(57) ABSTRACT

Techniques are described herein for asynchronous execution of queries on statically replicated graph data. In an embodiment, a graph is partitioned among a plurality of computers executing the graph querying engine. One or more high-degree vertices of the graph are each replicated in each graph partition. The partitions, including the replicated high-degree vertices, are loaded in memory of the plurality of computers. To execute a query, a query plan is generated based on the query. The query plan specifies a plurality of operators and an order for the plurality of operators. The order is such that if an operator requires data generated by another operator, then the other operator is ordered before the operator in the query plan. Replicated copies of a vertex is visited if matches made by subsequent operator(s) are limited by data unique to the replicated vertices.

20 Claims, 6 Drawing Sheets

(51) Int. Cl.
*G06F 16/901* (2019.01)
*G06F 16/27* (2019.01)

(58) Field of Classification Search
CPC ........ G06F 16/27; G06F 16/901; G06F 16/00;
G06F 17/00; G06F 17/30; G06F 16/134;
G06F 16/1734; G06F 16/1727; G06F
16/182; G06F 3/0608; G06F 3/064
See application file for complete search history.

(56) References Cited

U.S. PATENT DOCUMENTS

| | | | |
|---|---|---|---|
| 8,266,289 | B2 | 9/2012 | Saha |
| 8,312,464 | B2 | 11/2012 | Arimilli |
| 8,321,492 | B1 | 11/2012 | Sengupta et al. |
| 8,607,249 | B2 | 12/2013 | Otenko |
| 8,631,094 | B1 | 1/2014 | Alpert et al. |
| 9,183,058 | B2 | 11/2015 | Li |
| 9,189,457 | B2 | 11/2015 | Le Goff |
| 9,330,411 | B2 * | 5/2016 | Zhou ................. G06Q 30/0631 |
| 9,535,756 | B2 | 1/2017 | Depner et al. |
| 9,639,407 | B1 | 5/2017 | Braverman |
| 9,740,536 | B2 | 8/2017 | Van Der Lugt et al. |
| 9,772,890 | B2 * | 9/2017 | Ekanadham ........ G06F 16/9024 |
| 9,928,124 | B2 | 3/2018 | Vagg |
| 10,002,205 | B2 | 6/2018 | Roth et al. |
| 2005/0256893 | A1 | 11/2005 | Perry |
| 2007/0294665 | A1 | 12/2007 | Papakipos |
| 2008/0098375 | A1 | 4/2008 | Isard |
| 2009/0112784 | A1 | 4/2009 | Brun |
| 2009/0248754 | A1 | 10/2009 | Lipton |
| 2010/0306216 | A1 * | 12/2010 | Andersen ................. G06F 16/95 707/759 |
| 2012/0166417 | A1 * | 6/2012 | Chandramouli .. G06F 16/24568 707/713 |
| 2012/0166645 | A1 | 6/2012 | Boldyrev |
| 2012/0317579 | A1 | 12/2012 | Liu |
| 2012/0324472 | A1 | 12/2012 | Rossbach |
| 2013/0031550 | A1 | 1/2013 | Choudhury |
| 2013/0042254 | A1 | 2/2013 | Archer |
| 2013/0086328 | A1 | 4/2013 | Frank |
| 2014/0006503 | A1 * | 1/2014 | Serafini ................. G06F 16/958 709/204 |
| 2014/0096138 | A1 | 4/2014 | Dean |
| 2014/0115596 | A1 | 4/2014 | Khan |
| 2014/0136555 | A1 * | 5/2014 | Jacob ................. G06F 16/9024 707/754 |
| 2014/0181831 | A1 | 6/2014 | Le Scouarnec |
| 2014/0215477 | A1 | 7/2014 | Chen |
| 2014/0317292 | A1 | 10/2014 | Odom |
| 2014/0317635 | A1 | 10/2014 | Konno |
| 2014/0337850 | A1 | 11/2014 | Iniguez |
| 2015/0135185 | A1 | 5/2015 | Sirota |
| 2015/0187042 | A1 | 7/2015 | Gupta |
| 2015/0227582 | A1 * | 8/2015 | Gu ........................ G06F 16/958 707/713 |
| 2015/0370838 | A1 * | 12/2015 | Paradies ............. G06F 16/9024 707/738 |
| 2016/0063132 | A1 | 3/2016 | Chen et al. |
| 2016/0217007 | A1 | 7/2016 | Ueno |
| 2016/0342445 | A1 * | 11/2016 | van der Lugt ........ G06F 9/5083 |
| 2016/0378769 | A1 * | 12/2016 | Hopcroft .............. G06F 16/316 707/730 |
| 2016/0378828 | A1 * | 12/2016 | Hopcroft ............. G06F 16/2237 707/718 |
| 2017/0068746 | A1 | 3/2017 | Levin et al. |
| 2017/0199758 | A1 | 7/2017 | Gschwind |
| 2017/0351551 | A1 | 12/2017 | Manhardt |
| 2018/0039709 | A1 | 2/2018 | Chen et al. |
| 2018/0039710 | A1 | 2/2018 | Chen et al. |
| 2018/0075098 | A1 * | 3/2018 | Yin ................... G06F 16/24542 |
| 2018/0089270 | A1 * | 3/2018 | Qiu ................... G06F 16/24542 |
| 2018/0210966 | A1 * | 7/2018 | Bedi .................. G06F 16/24522 |
| 2018/0285401 | A1 * | 10/2018 | Dickie ................ G06F 16/2282 |
| 2018/0329953 | A1 * | 11/2018 | Weld ..................... G06F 16/252 |
| 2019/0102154 | A1 * | 4/2019 | Koupy .................... G06F 8/453 |
| 2019/0196890 | A1 * | 6/2019 | Bucchi .............. G06F 16/24545 |
| 2019/0258401 | A1 * | 8/2019 | Li .......................... H03M 7/707 |

OTHER PUBLICATIONS

Manhardt, U.S. Appl. No. 15/175,920, filed Jun. 7, 2016, Office Action, dated Nov. 15, 2017.
Manhardt, U.S. Appl. No. 15/175,920, filed Jun. 7, 2016, Notice of Allowance, dated Jan. 17, 2019.
Manhardt, U.S. Appl. No. 15/175,920, filed Jun. 7, 2016, Interview Summary, dated Feb. 21, 2018.
Manhardt, U.S. Appl. No. 15/175,920, filed Jun. 7, 2016, Final Office Action, dated Jun. 18, 2018.
Tian et al., From "Think Like a Vertex" to "Think Like a Graph", 40th International Conference on Very Large Data Bases, dated Sep. 2014, Proceedings of the VLDB Endowment, vol. 7, No. 3, 12 pgs.
Then et al., "Evaluation of Parallel Graph Loading Techniques", ACM, GRADES 2016 , Jun. 24, 2016, Redwood Shores, 6 pages.
Roth et al., "PGX.D/Async: A Scalable Distributed Graph Pattern Matching Engine", ACM, dated May 19, 2017, 6 pages.
Presta et al., "Large-scale Graph Partitioning with Apache Giraph", Engineering Blog, Facebook Code, dated Apr. 9, 2014, 8 pages.
Nelson et al., "Latency-Tolerant Software Distributed Shared Memory", dated Jul. 10, 2015, 15 pages.
Low et al., "Distributed GraphLab: A Framework for Machine Learning and Data Mining in the Cloud", Proceedings of the VLDB Endowment, vol. 5, No. 8, dated 2012, 12 pages.
Karypis, George,METIS, A Software Package for Partitioning Unstructured Graphs, Partitioning Meshes, and Computing Fill-Reducing Orderings of Sparse Matrices Version 5.1.0, dated Mar. 30, 2013, 35pgs.
Gonzalez, "GraphX: Graph Processing in a Distributed Dataflow Framework", Proceedings of the 11th USENIX Symposium on Operating Systems Design and Implementation, dated Oct. 2014, 16 pages.
Gonzalez et al., "PowerGraph: Distributed Graph-Parallel Computation on Natural Graphs", 10th USENIX Symposium on Operating Systems Design and Implementation, dated 2012, 14 pages.
Depner, U.S. Appl. No. 15/607,985, filed May 30, 2017, Notice of Allowance, dated Sep. 20, 2019.
Zhang et al., "REGTT: Accelerating Tree Traversals on GPUs by Exploiting Regularities", dated 2016, 10 pages.
Priya et al., "A Survey on Realizing Memory-Optimized Distributed Graph Processing", IOSR Journal of Engineering (IOSRJEN), vol. 8, Issue 8 dated Aug. 2018, 7 pages.
Lyu et al., "DBL: Reachability Queries on Dynamic Graphs", Technical Report, dated Jan. 4, 2019, 27 pages.
Dekel et al., "Cachesensitive Optimization of Immutable Graph Taversals (CS745 Project Report)", ACM, dated 2015, 9 pages.
Cong et al., "Solving Large, Irregular Graph Problems using Adaptive Work-stealing", dated 2008, 10 pages.

* cited by examiner

FAST DISTRIBUTED GRAPH QUERY ENGINE

CROSS-REFERENCE TO RELATED APPLICATIONS; BENEFIT CLAIM

This application claims the benefit of Provisional Appln. 62/673,366, filed May 18, 2018, the entire contents of which is hereby incorporated by reference as if fully set forth herein, under 35 U.S.C. § 119(e).

FIELD OF THE INVENTION

The present invention relates to graph processing. Specifically, the present invention relates to a query engine for distributed graph processing.

BACKGROUND

Graph querying and pattern matching are becoming an important feature of graph processing as it allows data analysts to easily collect and understand information about their graphs in a way that is similar to how structured query language (SQL) and other database languages allow users to collect and understand information for databases. Graph queries are a method of data analysis where the underlying dataset is represented as a graph, where data entities become vertices, and relationships between them become edges of the graph.

Through this graph representation, it becomes possible to analyze fine-grained relationships between data entities. Users can query the graph to find patterns in the data (e.g., find all pairs of vertices where both vertices are labeled as RED and are three hops away from each other). However, one of the key challenges in graph pattern matching is to process increasingly large graphs that often do not fit in the memory of a single machine.

One possible solution is to utilize a distributed system that can perform graph queries. In these systems, the graph data may be spread over multiple machines that are connected through a network, and the graph processing computations are performed in a distributed manner. For example, the system may translate a graph query into a relational query, and then execute the query simply using a conventional, distributed relational query engine.

However, such an approach neglects important characteristics of graph queries, which differ from relational queries. For instance, neighbor matching is a common operation in graph queries. When using relational queries, neighbor matching is often translated into a relational join operator. Consequently, graph queries using a relational query engine end up with many distributed join stages whose performance and scalability are hampered by synchronization overhead and memory pressure from storing many partial solutions. Therefore, this approach results in suboptimal performance and scalability.

In addition, distributed graph processing performance is greatly determined by how the graph data is partitioned and replicated across the multiple machines. The number of edges that cross between partitions (i.e. machine boundaries) determines the amount of communication between two machines. An edge between vertices in the same partition, also referred to herein as a local edge, requires less work than a remote edge, that is, an edge between vertices that are in different partitions (i.e. on different machines).

Some solutions focus on optimizing data partitioning to reduce the amount of communication required for graph processing. That is, one solution is to distribute the graph data among multiple machines in a way that minimizes the number of crossing, or remote, edges. However, minimizing the number of crossing edges when partitioning graph data is a known NP-hard problem. In other words, due to the extreme complexity of the problem, there are no practical algorithmic solutions. These systems often rely on external partitioning tools or use heuristic methods to partition the graph data. Additionally, due to the innate characteristics of large real-world graph data, the optimized partitions may still have a large number crossing edges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments are described herein of a distributed graph querying engine that allows queries to run on statically replicated graph data with asynchronous execution. In an embodiment, a graph is partitioned among a plurality of computers executing the graph querying engine. One or more high-degree vertices of the graph are each replicated in each graph partition. The partitions, including the replicated high-degree vertices, are loaded in memory of the plurality of computers.

To execute a query, the system generates a query plan comprising a plurality of operators. The system determines an order for the plurality of operators. In an embodiment, the order is such that if an operator requires data generated by another operator, then the other operator is ordered before the operator in the query plan.

In an embodiment, the system determines whether replicated copies of a vertex should be visited when executing an operation. Determining whether to visit a replicated copy may be based on whether matches made by subsequent operator(s) are limited by data unique to the replicated vertex. In an embodiment, replicated copies of a vertex should always be visited if the operation is a common neighbor match operation.

Since only high-degree vertices are replicated on multiple computers, the amount of memory required to load a graph in each computer is reduced. Furthermore, the amount of network communication required to retrieve information from other computers is reduced, since high-degree vertices are likely to be the most commonly visited vertices. In addition, this is further optimized by only visiting replicas of high-degree vertices in particular situations.

Further improvement of the system is derived from the query plan operations being ordered such that they may be performed asynchronously at each computer. The computers can each perform its operations individually, and do not need to wait for each other computer to finish each operation before proceeding to the next. This allows the system to more efficiently execute a query.

Example System

Figure 1:
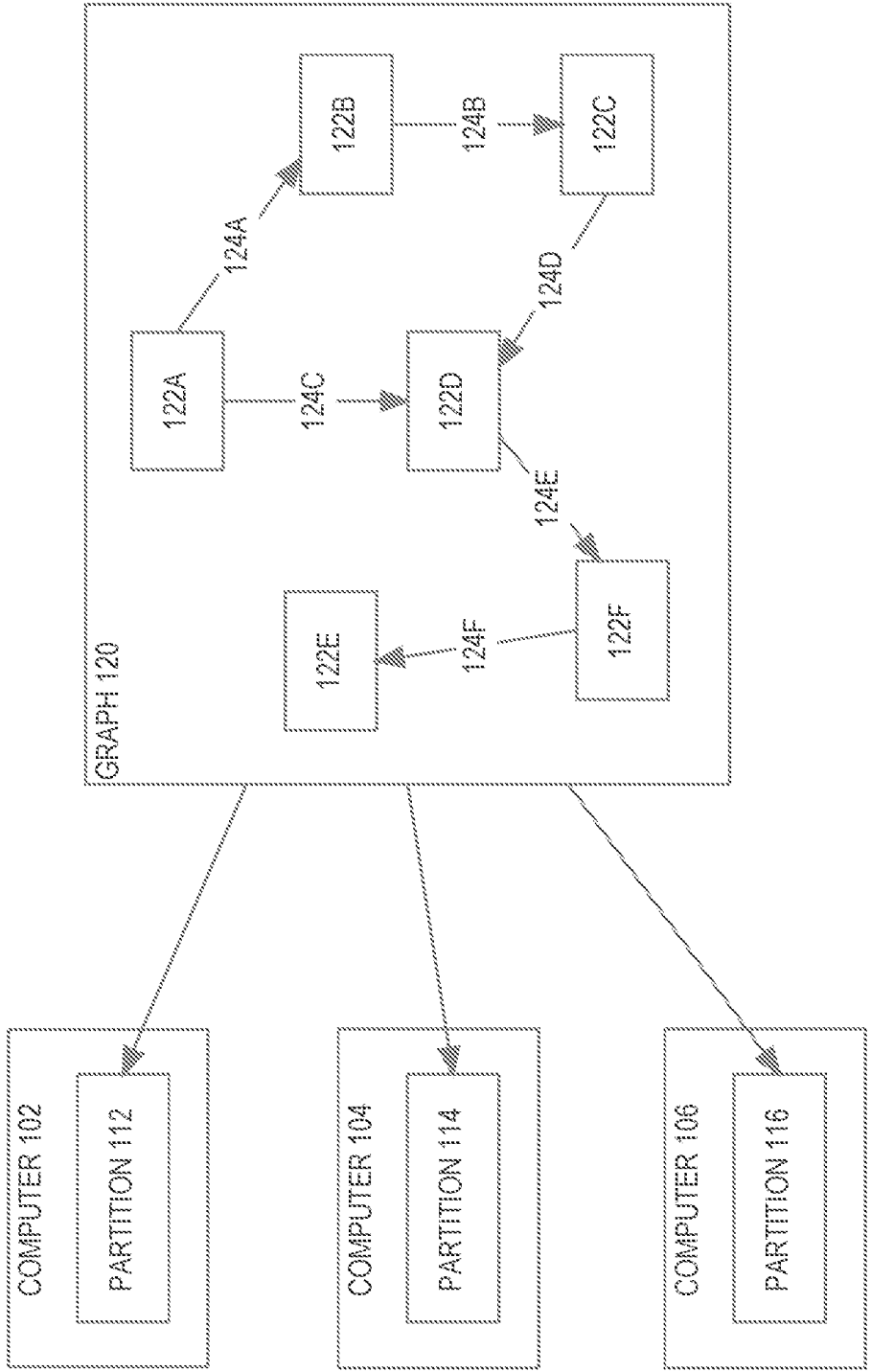
FIG. 1 is a block diagram that depicts an example distributed system that asynchronously executes graph queries on a distributed graph, in an embodiment.

FIG. 1 is a block diagram that depicts an example distributed system 100, in an embodiment. Distributed system 100 executes a query engine that asynchronously executes queries on statically replicated graph.

Distributed system 100 includes a plurality of networked computers, such as computers 102-106. Computers 102-106 may each be a rack server such as a blade, a personal computer, a mainframe, a network appliance, a virtual machine, a smartphone, or another computing device. Computers 102-106 may also be implemented by a virtual machine system or other software-based implementation of a computing device, such as cloud computing instances. Computers 102-106 intercommunicate over any combination of wired or wireless connections that span one or more networks such as local area network (LAN), wide area network (WAN), backplane, or internetwork.

In the embodiment illustrated in FIG. 1, computers 102-106 have access to graph 120. Graph 120 may be stored in a file, database, or other shared data store.

Graph 120 is a logical graph comprising a plurality of vertices 122A-F that are interconnected by a plurality of edges 124A-F. In the illustrated embodiment, graph 120 is a directed graph. Each edge originates from a source vertex and terminates at a target vertex. For example, edge 124A originates from vertex 122A and terminates at vertex 122B. A vertex may serve as a source vertex for some edges and a target vertex for other edges. Additionally, a vertex need not originate any edges or need not terminate any edges, and an edge may originate from and terminate at a same vertex. In other embodiments, the graph may be an undirected graph. Edges connect two vertices, but the edges do not point in a particular direction, or point in both directions (bi-directional).

As discussed in further detail below, to process queries for graph 120, each of computers 102-106 respectively load partitions of graph 120 into memory, such as partitions 112-116.

Graph Loading and Partitioning

Prior to performing any analytics or queries, the system loads one or more graphs into memory of one or more computers in the system. The graph data is partitioned across multiple computers, such as computers 102-106. Partitioning the vertices allows each computer to perform part of the processing on a respective set of vertices and edges, i.e., distributed processing.

Unlike typical systems, the techniques described herein do not require partitioning to be planned based on the shape of the particular graph or the configuration of computers in the system. Thus, any partitioning method may be used to divide the plurality of edges 122A-F and vertices 124A-F among the plurality of computers 102-106. In some embodiments, the loading and partitioning only need to be performed once for each graph loaded in the lifetime of the system.

Static replication is used to offset processing inefficiencies from imperfect partitioning. In an embodiment, one or more high-degree vertices are identified. A high-degree vertex is a vertex that has many connected edges. The system may be configured to identify a high-degree vertex based on a threshold number of edges and/or based on an average number of edges of vertices in the graph.

If a vertex is determined to be a high-degree vertex, its edges are kept local to whichever computer would normally contain them. In an embodiment, the edges are kept local to the machine that contains the other side of the edge. A copy of the vertex is made on each computer that has loaded an edge connected to the vertex, and the edges are connected to the local (replicated) copy of the vertex rather than the original (remote) copy of the vertex. If a computer that does not host the original vertex needs to visit the vertex while processing the graph data, the computer can access its local replicated copy of the vertex. Visiting a vertex or edge may comprise requesting and/or receiving data for the vertex or edge. In some embodiments, visiting a vertex may comprise a traversal operation to the particular vertex. As such, no network communication is required.

The replicated vertex may also be referred to as a ghost vertex. A ghost vertex is a lightweight proxy that represents the same vertex on multiple computers. Each replicated vertex is connected to the local edges of the original vertex. In some embodiments, the original vertex may be deleted from the graph.

Figure 2A:
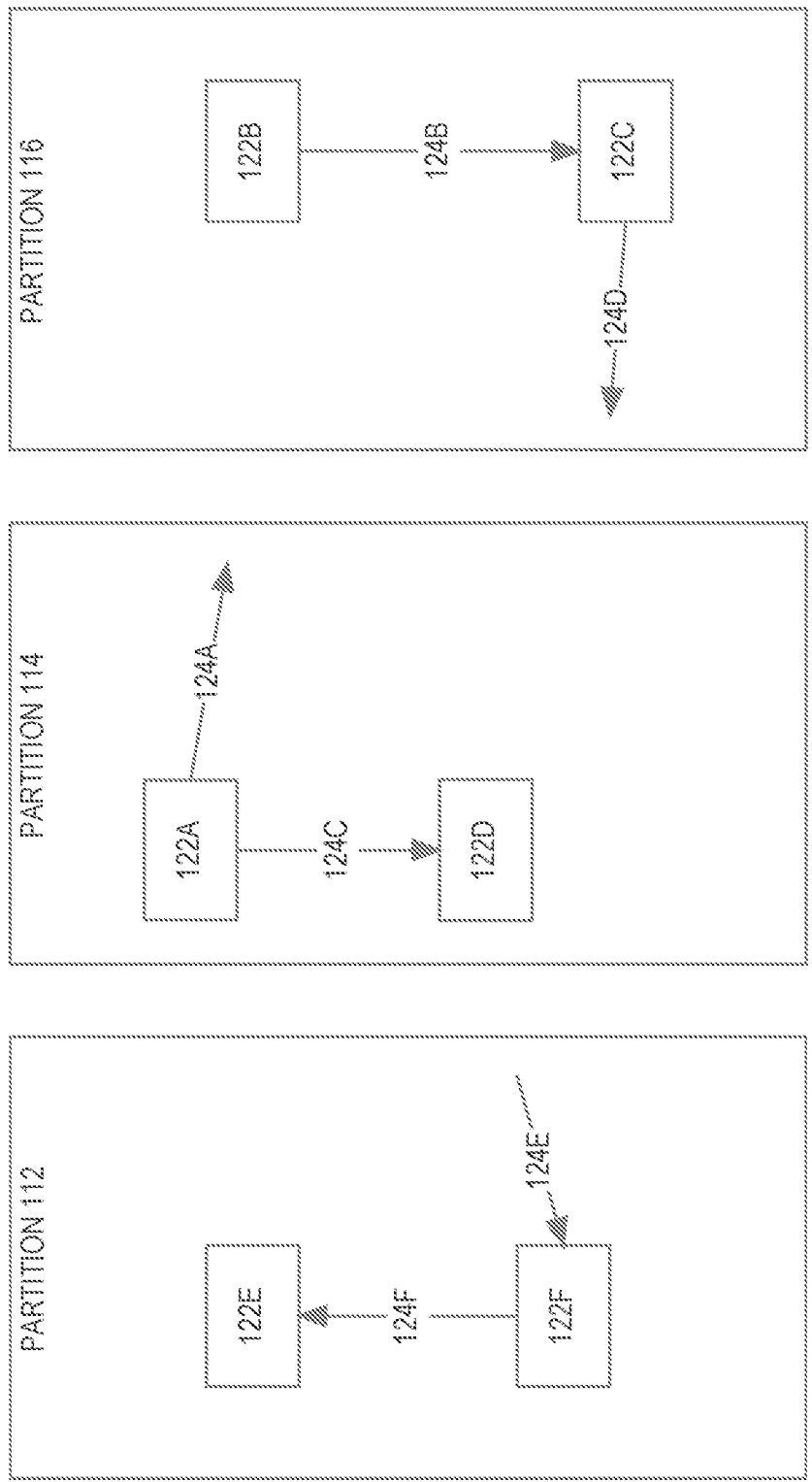
FIG. 2A is a block diagram that depicts example partitions of a graph, in an embodiment.

FIG. 2A illustrates example partitions 112-116 of graph 120. In the illustrated example, graph 120 is partitioned such that: partition 114 comprises vertices 122E and 122F, and edges 124F and 124E; partition 114 comprises vertices 122A ad 122D, and edges 124A and 124C; and partition 116 comprises vertices 122B and 122C, and edges 124B and 124D.

For the purpose of illustrating a clear example, assume a high-degree vertex is a vertex with three or more connected edges. In graph 120, vertex 122D is a high-degree vertex, since it is connected to three edges, 124C-E. Therefore, a copy of vertex 122D is made in each of partitions 112-116. Vertex 122D may be referred to as a ghost vertex or a replicated vertex.

Figure 2B:
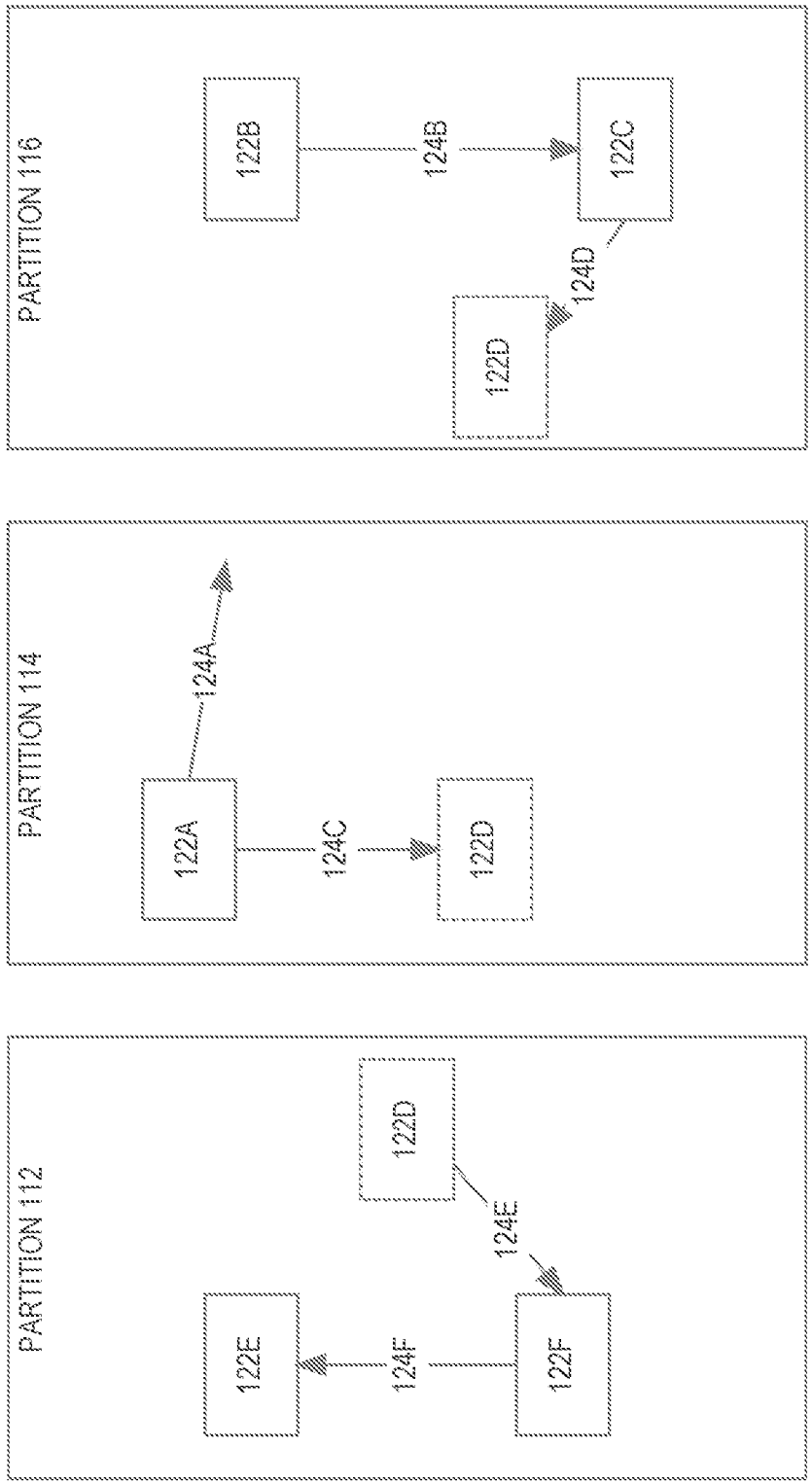
FIG. 2B is a block diagram that depicts example partitions of a graph with replicated vertices, in an embodiment.

FIG. 2B illustrates partitions 112-116 with replicated vertex 122D. The replicated copies are each connected to edges that are local to partitions 112-116. For example, partition 116 includes edge 124D. In graph 120, edge 124D is connected to the original 122D, so in partition 116, edge 124D is connected to the replicated copy of vertex 122D.

Each replicated vertex may have a neighbor list that comprises only local edges. Referring to the above example, the copy of vertex 122D in partition 116 may indicate that it has a single connected edge, 124D, and the copy of vertex 122D in partition 112 may indicate that it has a single connected edge, 124E. Additionally, in the illustrated example, partition 114 includes a replicated copy of vertex 122D and the original vertex 122D is not included in any partitions.

A benefit of using ghost vertices is that copies of high degree vertices are visible from each computer that has loaded one or more edges connected to the vertices. For most graphs, communication normally happens to a small number of vertices that have a large number of edges. In other words, when a computer is traversing the graph data structure, it is more likely that a high-degree vertex will be reached. Instead of asking a different computer for the original high-degree vertex each time, the computer can look at its local copy of the ghost vertex. This eliminates an extra communication step and causes the processing to be performed faster.

In some embodiments, the properties of the vertex are replicated at the ghost vertex on each computer. Thus, the original vertex does not necessarily need to be visited in order to retrieve its properties. It is also not necessary to communicate with another computer when identifying common vertices between two edges, if the vertices being checked are either local or replicated vertices. Additionally, traversal to a high-degree vertex may be started on each computer without immediately having to do any communication.

Partitioning schemes without static replication would not have any ghost vertices, and therefore would not have the benefit provided by the replicated vertices. Many other systems only support distributed execution when copies of the entire graph can be made on each machine and will run multiple different queries using multiple machines. However, if a graph is too large, it cannot be copied entirely on a single machine. Additionally, the graph cannot be updated without halting execution on all the other machines in order to synchronize the data. Additionally, the main advantage of a distributed system is not achieved, where if the graph is too large to fit into memory of a single machine, the system can still process the graph.

Other systems that do implement true distributed queries do not do any replications. If an edge crosses between two computers, it would always involve communication. If there were a billion edges between the same two computers from the same two vertices, traversing the billion edges would involve a large amount of inter-computer communication. Thus, the present techniques greatly reduce the amount of internode communication compared to typical approaches.

Query Planning

Figure 3:
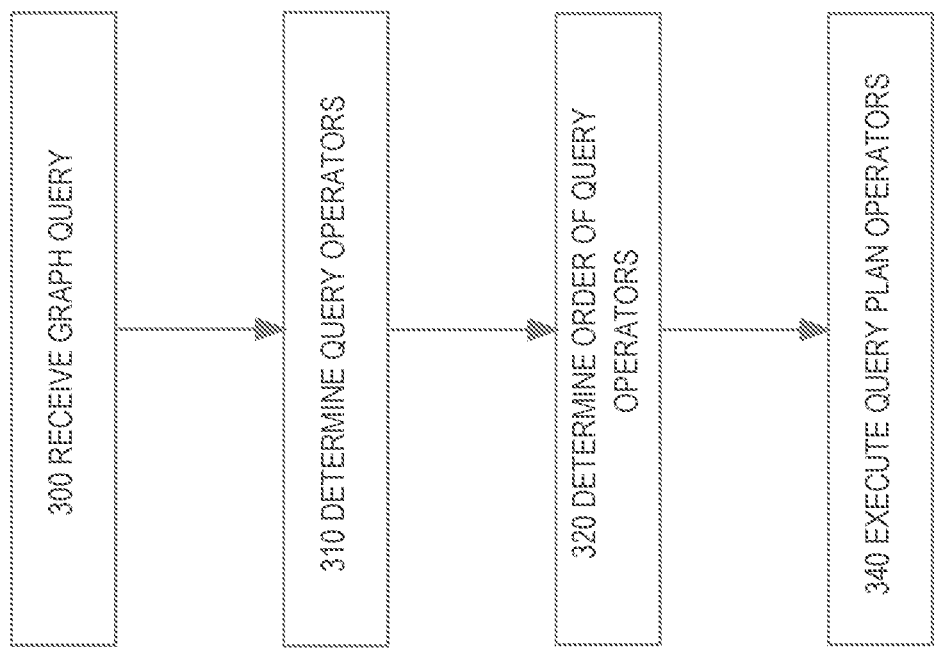
FIG. 3 is a flowchart of an example process for executing a graph query, in an embodiment.

FIG. 3 illustrates an example process for executing queries using system 100.

At step 300, system 100 receives a query for graph 120. The system may receive queries in the form of query text. Queries may be specified using a graph query language, such as property graph query language (PGQL).

To execute the received query, the system generates a query plan based on the contents of the query. In an embodiment, a query plan defines a list of operators that each perform an operation on the graph or on one or more portions of the graph, and an order for performing the operators. Additionally, the query plan may indicate one or more particular partitions and/or computers on which to perform the operator.

At step 310, the system determines a plurality of query plan operators corresponding to the received query. Additionally, the system may determine, based on the graph partition loaded into the plurality of computers, which computer(s) should perform each operator.

At step 320, the system determines an order in which the plurality of operators should be executed. In an embodiment, the operators are ordered such that data required by an operator is always provided explicitly or by a previous operator. Generating the query plan may comprise determining, for each operator, whether another operator requires data obtained from or generated by the operator. If a second operator requires data obtained from or generated by the operator, then the query plan indicates that the operator should be performed prior to the second operator.

As discussed above, in some embodiments, a ghost vertex at a computer does not contain all edges connected to the original high-degree vertex. The ghost vertex is connected to the local edges within the partition loaded by the computer. When generating the query plan, the system configures the list of operators such that each operator may execute on a computer without having complete access to a vertex's edge list. The computer performing the operation retrieves an edge list from its copy of a vertex and applies the operation on the retrieved edges.

In an embodiment, when constructing the query plan, operators are configured such that replicated instances of a vertex are visited if and only if edges and/or vertices matched by one or more subsequent operators are limited by the data that is unique on each replicated instance, such as its list of connected edges or neighbor list.

However, as explained in further detail below, the common neighbor match operator is applied to all replicated instances of a vertex, rather than being limited to any single replicated instance. This is the case regardless of whether matches made by subsequent operators are limited by data unique to a replicated instance.

Additionally, in some scenarios, it may not be desirable to visit all replicated instances of a vertex. As an example, assume a query plan comprises multiple stages, wherein each stage specifies a plurality of operators, and a final operator. The final operator is only be applied to a single instance of any replicated vertices, unless its output is limited by the edge list of its current vertex. Otherwise, applying the final operator to multiple instances of the same ghost vertex may produce duplicate results.

Query Operators

The query plan operators traverse the distributed graph and match graph data. In an embodiment, query plan operators include one or more of: neighbor match, edge match, traversal, and common neighbor match. Additionally, query plan operators may be implementation-specific operator types, such as a specialized output operator.

Neighbor Match

A neighbor match operator determines which pairs of vertices and edges match a search pattern or part of a search pattern. To perform the neighbor match, the neighbor match operator visits a vertex, "v," in its partition and obtains the neighbor list (list of connecting edges) for v. For each edge, "e," that is in v's neighbor list, the operator checks v and e against any constraints from the query to determine whether they match the search pattern or part of the search pattern.

Matched pairs of vertices and edges are passed to subsequent operator(s) in the query plan. The subsequent operator(s) may visit the other vertex attached to e (the vertex that is not v). Since the subsequent operator(s) are limited to matched vertices/edges in v's neighbor list (i.e. data that is unique to v), then replicated instances of v need to be visited if v is a ghost vertex. The neighbor match operator is applied to each of the replicated instance of v.

Edge Match

An edge match operator determines whether two vertices are connected by a shared edge. The edge match operator visits edges 'e' between two known vertices 'v1' and 'v2' by iterating over the neighbor list of one of the vertices. The edge match operator visits a vertex, either v1 or v2, and obtains its neighbor list. The edge match operator then checks whether each edge e in the neighbor list connects to the other vertex. Additionally, the edge match operator may check if e meets any constraints from the query to determine whether it matches part of the search pattern.

This operator must be applied with access to one of the two aforementioned vertices v1 or v2. If while performing previous operators either v1 or v2 are not visited naturally, the query planner may insert a traversal operator, described below, prior to the edge match operator. The traversal operator visits one of v1 or v2.

As mentioned above, the neighbor list for a replicated vertex is unique to the particular replicated vertex. Since the edge match operator uses the neighbor list of vertices, when generating the query plan, if the vertex whose neighbor list was used was a ghost vertex, then the operator is applied to each replicated instance of the vertex.

Traversal

The traversal operator visits a particular vertex or edge in the graph. In an embodiment, the vertex or edge was previously matched by another operator, specified explicitly in the query, or provided by a scan of all vertices in the partition.

When generating a query plan, the system may insert traversal operators in the query plan for various reasons. In an embodiment the system determines that one or more vertices/edges should be visited and include one or more traversal operators to visit each of the one or more vertices/edges. The determination may be based on, for example, which vertices/edges were visited by a previous operator, whether checks need to be performed on previously identified vertices/edges, whether particular vertices/edges still need to be visited, etc. As an example, some operators may require a previous operator to visit a certain vertex or edge. As another example, one or more operators may partially match certain edges or vertices, but require additional access to the graph to complete the match.

Common Neighbor Match

The common neighbor match operator finds edges "e1" and "e2" from two vertices, "v1" and "v2," to a common vertex "v3." In an embodiment, a triangle listing algorithm or other suitable tuple-identifying algorithm, is used to identify a plurality of tuples. The common neighbor match operator then checks the edges in the identified tuples against any constraints from the query to determine whether they match part of the search pattern. If these checks cannot be completed in the common neighbor match operator, the system ensures that the checks are applied in subsequent operators.

Unlike previous operators, the common neighbor match operator should be applied to all replicated instances of v1 and/or v2, whichever are ghost vertices, if any. In other words, the ghost vertices are visited regardless of whether matches made by subsequent operators are limited by data unique to the ghost vertex. If both vertices are ghost vertices, then a Cartesian product style operator is performed, where the operator is applied to all instances of both v1 and v2, in the context of each other instance of v1 and v2.

To illustrate a clear example, assume an implementation of the common neighbor match operator requires one or more previous operators to pass it an edge list. The received edge list may correspond to all or part of the edges in v/or v2, and the vertex to which it has direct access (either v/or v2) both limit the output of the operator. Both the operator that produces the edge list and the common neighbor match operator itself must be applied to each replicated instance of any ghost vertices. This is true regardless of the type of the former operator.

Query Execution

At step 330, the system executes the query by executing the plurality of operators specified by the query plan. During query execution, the system applies each operator of the query plan to the graph in the order specified by the query plan. In an embodiment, this order governs the entire scope of the query execution. That is, each operator is applied to the entire graph in order. Additionally or alternatively, the order governs only part of the scope of the query execution. Each operator transforms one or more (partial) results in the specified order, but multiple operators may execute concurrently. The final operator produces any results that comprise the solution set of a query. Once all operators have been applied to the graph as specified by the query plan, the solution set is considered complete and query execution terminates.

In an embodiment, while executing an operation, the system determines whether a particular visited vertex is a ghost vertex and whether the operator should be applied to other replicated instances of the ghost vertex. As discussed above, other than common neighbor match operator or special situations, replicated instances of a vertex are visited if and only if edges and/or vertices matched by one or more subsequent operators are limited by the data that is unique on each replicated instance. For example, if the edge match operator visits a ghost vertex but subsequent operators are not limited by the edges in the neighbor list of the ghost vertex, then the replicated instances of the ghost vertex on other computers do not need to be visited. In other embodiments, the query plan indicates for each operator, whether other replicated instances of a ghost vertex should be visited or not, based on the subsequent operators in the query plan.

In an embodiment, the system executes the query plan asynchronously. Each computer of the plurality of computers performs one or more operators assigned to the computer. If the operation requires communication with another computer, it requests the data but may continue processing other computations until the requested data is received.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
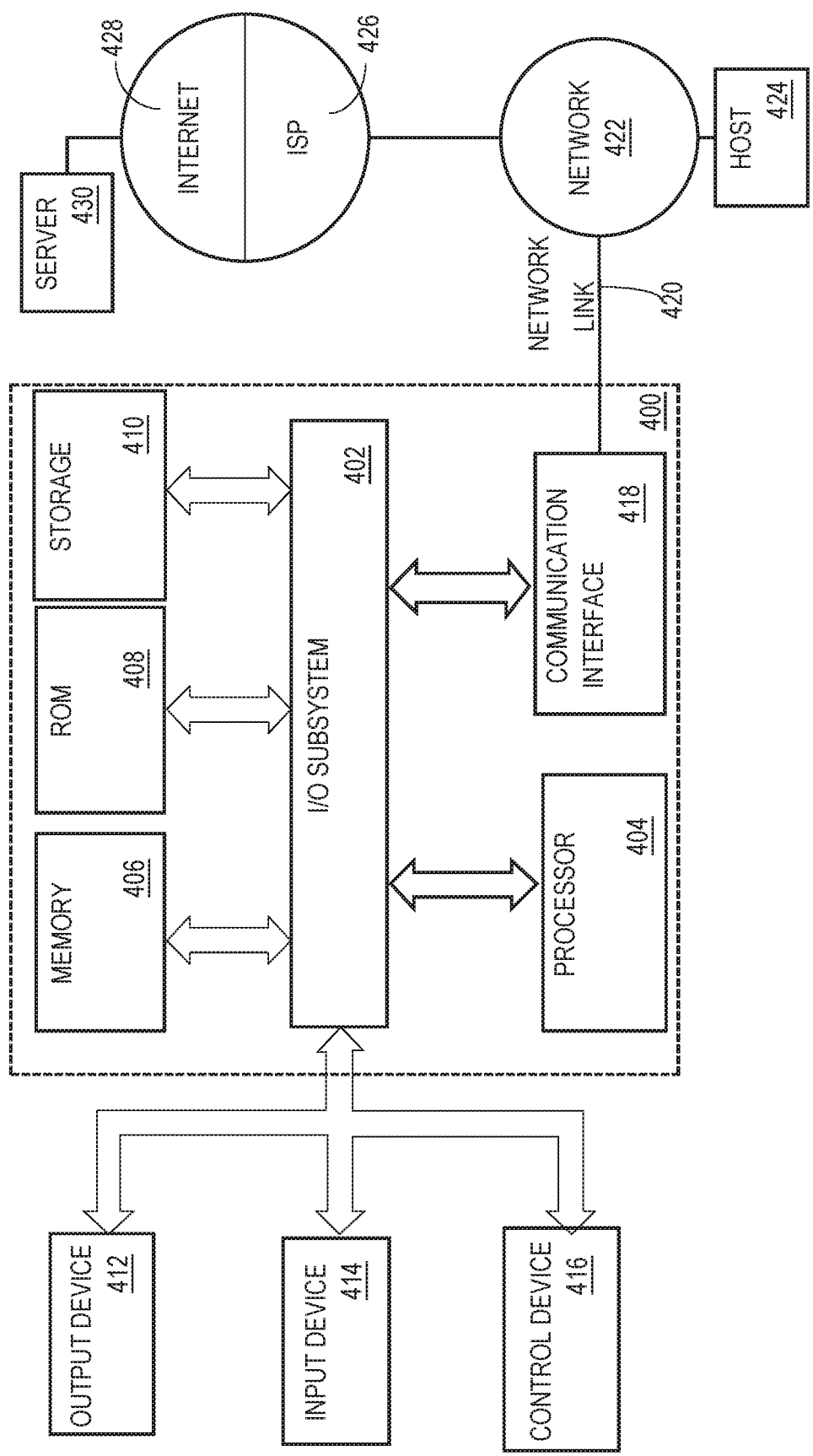
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of a program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 5:
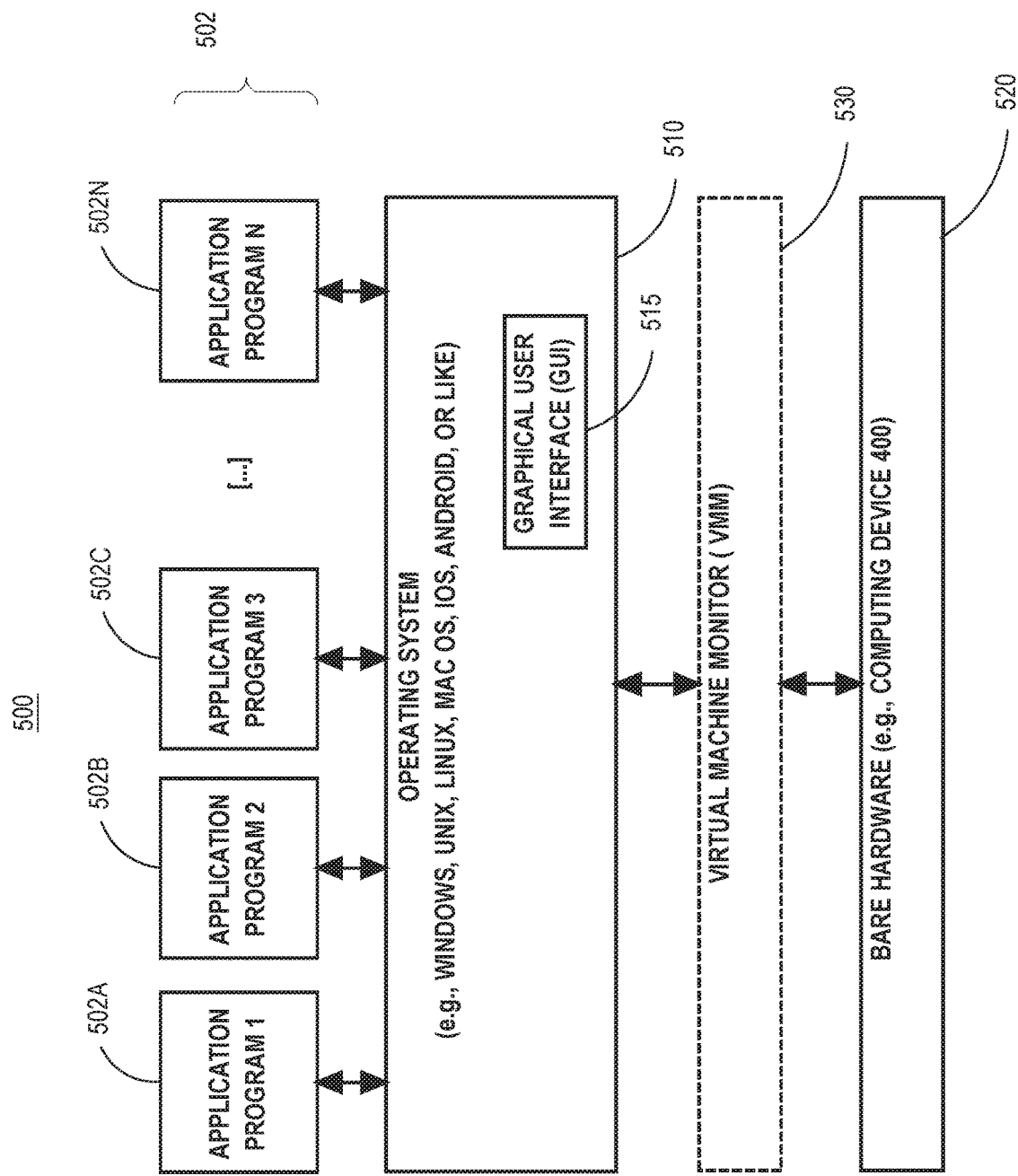
FIG. 5 is a block diagram that depicts a software system that may be employed for controlling the operation of a computer system according to an embodiment of the present invention.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method comprising:
loading a graph into memory of a plurality of computers, the graph comprising a plurality of vertices and a plurality of edges, wherein loading the graph into memory of the plurality of computers comprises:
partitioning the graph into a plurality of graph portions, each graph portion comprising a respective set of one or more particular vertices of the plurality of vertices and a respective set of one or more edges of the plurality of edges;
identifying one or more high degree vertices of the plurality of vertices;
for each high degree vertex of the one or more high degree vertices, replicating the high degree vertex in each graph portion of the plurality of graph portions;
for each computer of the plurality of computer, loading a respective graph portion into the memory of the computer;
receiving a query for the graph;
generating, based on the plurality of graph portions, a query plan for the query, the query plan specifying a plurality of graph operations and an order for executing the plurality of graph operations;
each computer of the plurality of computers asynchronously executing one or more graph operations of the plurality of graph operations specified by same said query plan for the query that target the respective graph portion loaded into the memory of the computer.

2. The method of claim 1 wherein determining the order for executing the plurality of graph operations comprises determining a first operation requires data generated by a second operation, and wherein the order specifies executing the second operation prior to the first operation.

3. The method of claim 1 wherein the order for executing the plurality of graph operations is applied to the entire graph.

4. The method of claim 1 wherein the order for executing the plurality of graph operations is applied to the respective graph portion loaded into memory of each computer of the plurality of computers.

5. The method of claim 1 wherein executing the one or more graph operations comprises, for each graph operation, determining whether to request data from one or more replicated vertices.

6. The method of claim 5 wherein determining whether to request data from one or more replicated vertices comprises determining whether one or more subsequent operations are limited by data unique to each of the one or more replicated vertices.

7. The method of claim 5 wherein determining whether to request data from one or more replicated vertices is based on an operation type of the graph operation.

8. The method of claim 7 wherein the operation type of the graph operation is a neighbor match, wherein a particular vertex matched by the neighbor match is a replicated vertex, the method further comprising determining data should be requested from copies of the particular vertex at one or more other computers.

9. The method of claim 7 wherein the operation type of the graph operation is an edge match, wherein executing the graph operation comprises determining whether one or more edges of a first particular vertex connect to a second particular vertex, wherein the first particular vertex is a replicated vertex, the method further comprising determining data should be requested from copies of the first particular vertex at one or more other computers.

10. The method of claim 7 wherein the operation type of the graph operation is a common neighbor match, wherein executing the common neighbor match comprises determining whether a first particular vertex and a second particular vertex are connected to visited by the common neighbor match is a replicated vertex, the method further comprising determining data should be requested from copies of the first particular vertex and copies of the second particular vertex at one or more other computers.

11. A system comprising:
one or more processors;
non-transitory computer-readable media storing instructions which, when executed by the one or more processors, causes:
loading a graph into memory of a plurality of computers, the graph comprising a plurality of vertices and a plurality of edges, wherein loading the graph into memory of the plurality of computers comprises:
partitioning the graph into a plurality of graph portions, each graph portion comprising a respective set of one or more particular vertices of the plurality of vertices and a respective set of one or more edges of the plurality of edges;
identifying one or more high degree vertices of the plurality of vertices;
for each high degree vertex of the one or more high degree vertices, replicating the high degree vertex in each graph portion of the plurality of graph portions;
for each computer of the plurality of computer, loading a respective graph portion into the memory of the computer;
receiving a query for the graph;
generating, based on the plurality of graph portions, a query plan for the query, the query plan specifying a plurality of graph operations and an order for executing the plurality of graph operations;
each computer of the plurality of computers asynchronously executing one or more graph operations of the plurality of graph operations specified by same said query plan for the query that target the respective graph portion loaded into the memory of the computer.

12. The system of claim 11 wherein determining the order for executing the plurality of graph operations comprises determining a first operation requires data generated by a second operation, and wherein the order specifies executing the second operation prior to the first operation.

13. The system of claim 11 wherein the order for executing the plurality of graph operations is applied to the entire graph.

14. The system of claim 11 wherein the order for executing the plurality of graph operations is applied to the respective graph portion loaded into memory of each computer of the plurality of computers.

15. The system of claim 11 wherein executing the one or more graph operations comprises, for each graph operation, determining whether to request data from one or more replicated vertices.

16. The system of claim 15 wherein determining whether to request data from one or more replicated vertices comprises determining whether one or more subsequent operations are limited by data unique to each of the one or more replicated vertices.

17. The system of claim 15 wherein determining whether to request data from one or more replicated vertices is based on an operation type of the graph operation.

18. The system of claim 17 wherein the operation type of the graph operation is a neighbor match, wherein a particular vertex matched by the neighbor match is a replicated vertex, the instructions further cause determining data should be requested from copies of the particular vertex at one or more other computers.

19. The system of claim 17 wherein the operation type of the graph operation is an edge match, wherein executing the graph operation comprises determining whether one or more edges of a first particular vertex connect to a second particular vertex, wherein the first particular vertex is a replicated vertex, the instructions further cause determining data should be requested from copies of the first particular vertex at one or more other computers.

20. The system of claim 17 wherein the operation type of the graph operation is a common neighbor match, wherein executing the common neighbor match comprises determining whether a first particular vertex and a second particular vertex are connected to visited by the common neighbor match is a replicated vertex, the instructions further cause determining data should be requested from copies of the first particular vertex and copies of the second particular vertex at one or more other computers.

* * * * *

UNITED STATES PATENT AND TRADEMARK OFFICE
CERTIFICATE OF CORRECTION

PATENT NO. : 10,990,595 B2
APPLICATION NO. : 16/274210
DATED : April 27, 2021
INVENTOR(S) : Roth et al.

Page 1 of 1

It is certified that error appears in the above-identified patent and that said Letters Patent is hereby corrected as shown below:

In the Specification

In Column 7, Line 64, delete "v/" and insert -- v1 --, therefor.

In Column 7, Line 65, delete "v/" and insert -- v1 --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*